(12) United States Patent
Forohar et al.

(10) Patent No.: US 9,819,016 B1
(45) Date of Patent: Nov. 14, 2017

(54) CARBON NANOTUBE BASED COMPOSITE ELECTRODE

(71) Applicant: Department of the Navy, Washington, DC (US)

(72) Inventors: Farhad Forohar, Laplata, MD (US); Victor Bellitto, Alexandria, VA (US); Vasant Shivran Joshi, LaPlata, MD (US); Stanley Caulder, Alexandria, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/756,651

(22) Filed: Sep. 29, 2015

(51) Int. Cl.
| | |
|---|---|
| *H01M 4/36* | (2006.01) |
| *H01M 10/0525* | (2010.01) |
| *H01M 4/04* | (2006.01) |
| *C01B 31/30* | (2006.01) |

(52) U.S. Cl.
CPC .......... *H01M 4/366* (2013.01); *C01B 31/303* (2013.01); *H01M 4/0426* (2013.01); *H01M 10/0525* (2013.01); *H01M 2220/20* (2013.01); *H01M 2220/30* (2013.01)

(58) Field of Classification Search
CPC ...... H01M 4/36; H01M 4/366; H01M 4/0426; H01M 10/0525
See application file for complete search history.

(56) References Cited

U.S. PATENT DOCUMENTS

| | | |
|---|---|---|
| 7,147,966 B2 | 12/2006 | Ren et al. |
| 7,348,102 B2 | 3/2008 | Li et al. |
| 7,442,284 B2 | 10/2008 | Ren et al. |
| 8,236,446 B2 | 8/2012 | Lu |
| 8,597,835 B2 | 12/2013 | Kawasaki et al. |
| 8,956,765 B2 | 2/2015 | Wang et al. |
| 2013/0070391 A1* | 3/2013 | Zheng ............... H01G 9/042 361/508 |
| 2015/0145162 A1* | 5/2015 | Jin ................... C23C 14/0605 264/131 |

\* cited by examiner

*Primary Examiner* — Karie O'Neill Apicella
(74) *Attorney, Agent, or Firm* — Fredric J. Zimmerman

(57) ABSTRACT

A composite electrode includes a sheet of carbon nanotubes (CNTs) and an electrically conductive metal. The sheet of CNTs include a surface region where carbon atoms are available. The metal is chemically bonded to at least a portion of the carbon atoms whereby a metal carbide is defined.

17 Claims, 4 Drawing Sheets

CARBON NANOTUBE BASED COMPOSITE ELECTRODE

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to electrode constructions, and more particularly to a carbon nanotube based composite electrode.

BACKGROUND OF THE INVENTION

Lithium ion batteries are being used in a variety of commercial products ranging from hand-held devices to automobiles. Advantages associated with lithium ion batteries include their high energy density and their ability to be recharged. Unfortunately, there are also several disadvantages associated with lithium ion batteries. For example and in general, lithium ion batteries tend to exhibit low power density due to the speed of lithium ion diffusion on the batteries' electrodes. More specifically, cathode materials in many commercial lithium ion batteries have a specific capacity (or discharge capacity as it is also known) in the range of 120-200 milliamp hour per gram (mAh/g), whereas the usual anode material of graphite has a practical specific capacity of approximately 350 mAh/g. Increasing the specific capacity of a battery's anode would improve battery performance.

More recently, it has been proposed to make lithium ion battery electrodes from a layered arrangement of a carbon nanotube sheet and a copper foil. However, typical thicknesses of a copper foil (e.g., on the order of 25-100 microns) adds considerable weight to the battery.

SUMMARY OF THE INVENTION

Accordingly, it is an object of the present invention to provide a battery electrode.

Another object of the present invention is to provide an electrode that improves the performance of rechargeable lithium ion batteries.

Other objects and advantages of the present invention will become more obvious hereinafter in the specification and drawings.

In accordance with the present invention, a composite electrode includes a sheet of carbon nanotubes (CNTs) and an electrically conductive metal. The sheet of CNTs has a surface region where carbon atoms are available at the surface region. The electrically conductive metal is chemically bonded to at least a portion of the carbon atoms by sputter deposition where a metal carbide is defined thereby.

BRIEF DESCRIPTION OF THE DRAWINGS

Other objects, features and advantages of the present invention will become apparent upon reference to the following description of the exemplary embodiments and to the drawings, where corresponding reference characters indicate corresponding parts throughout the several views of the drawings and wherein.

DETAILED DESCRIPTION OF THE INVENTION

Figure 1:
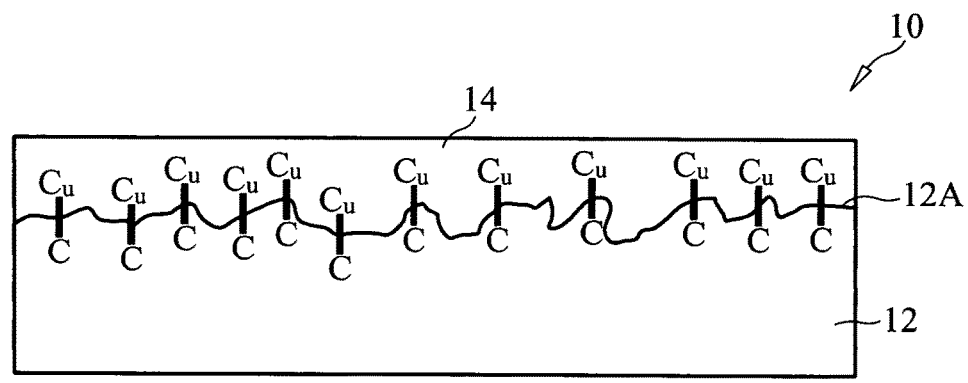
FIG. 1 is a schematic view of a composite electrode in accordance with an embodiment of the present invention.

Referring now to the drawings and more particularly to FIG. 1, a composite electrode in accordance with an embodiment of the present invention is shown and is referenced generally by numeral 10. It is to be understood that the size, shape and relative dimensions of composite electrode 10 and its elements are not to scale and are only for purposes of facilitating an understanding of the present invention. Composite electrode 10 may be used as the electrode in a variety of devices to include lithium ion batteries.

Composite electrode 10 includes a sheet of carbon nanotubes (CNTs) 12 and a layer of an electrically conductive metal 14 such as, for example, copper. Since copper is a well-accepted metal of choice for use in electronics, it will be assumed hereinafter that metal 14 is copper. Carbon nanotube sheet 12 may be a mat or sheet of single or multi-wall CNTs bound together into a thin and flexible sheet that also may include pure carbon and carbonous filler material(s). Such sheets are commercially available from, for example, Nanocomp Technologies, Inc., Merrimack, N.H. CNT sheets also may be made by mixing CNTs with a binder and some carbon black in N-methyl pyrrolidinone (NMP) as is known in the art. See, for example, Zhong-Shuai Wu et al., AcsNano, 2001, Vol. 5, No. 7, pp. 5463-5471, and Ge Chen et al., Chem. Mater. 2008, Vol. 20, No. 22, pp. 6951-6956. In each of these CNT sheets, the surface region 12A of sheet 12 presents a generally geometrically irregular surface (on a microscopic scale) that includes exposed portions of carbon nanotubes and carbon/carbonous filler materials where carbon atoms are free or available at the exposed portions. In the figures, the exposed portions of surface region 12A having carbon atoms free or available for reaction are depicted by "C".

Metal 14 is applied via sputter deposition (e.g., via plasma vapor deposition) onto some or all of surface region 12A to form a thin layer of metal 14 thereon. In the FIG. 1 embodiment, metal 14, such as copper, makes contact with sheet 12 all along its irregular surface region 12A. More importantly, some or all of the available carbon atoms "C" at surface region 12A chemically bond to copper atoms "Cu" in metal 14. The chemical bond between an available carbon atom "C" and copper "Cu" is depicted in the drawings by bold connector lines. By forming a chemical bond between sheet 12 and metal 14, composite electrode 10 has no discontinuities at the interface between the CNTs and metal 14. To verify the chemical bonding at the CNT-metal interface, X-ray photoelectron spectrums were generated for the carbon region of a bare sheet of CNTs (FIG. 2), and for a sheet of CNTs having 2 nanometers of copper sputtered thereon.

Figure 2:
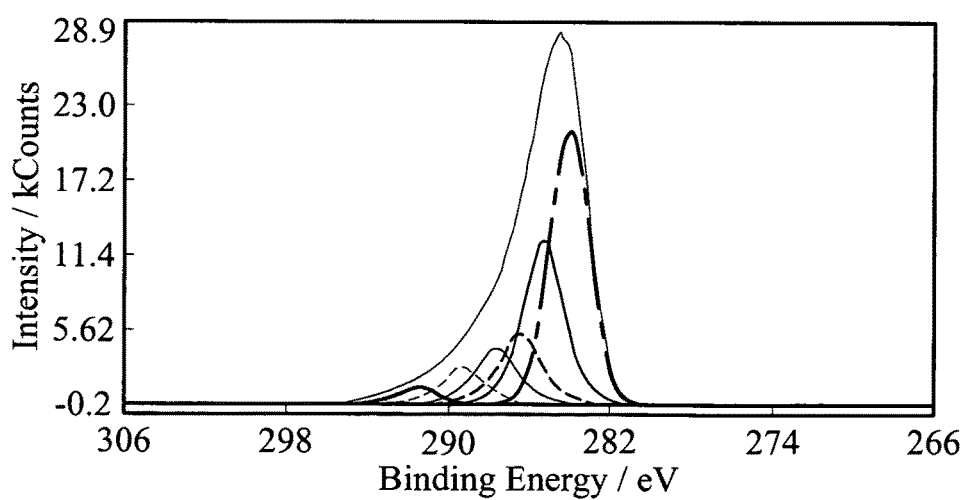
FIG. 2 is an X-ray photoelectron spectrum of a carbon region of a bare sheet of carbon nanotubes.

FIG. 2 illustrates the X-ray photoelectron spectrum of the carbon 1s (or "C 1s" as it is also referred to in the art) region of a bare multi-wall CNT sheet. Deconvolution of the C is spectrum revealed six peaks. The first peak at 284 eV is due to sp2-hybridized carbon atoms and carbon atoms bonded to hydrogen atoms. The next peak at 285 eV is attributed to the sp3-hybridized carbon atoms. The peaks centered at ~286 eV, 287 eV and 289 eV correspond to the carbon atoms bonded to one oxygen atom by a single bond (e.g., C—O), by a double bond (e.g., C=O), and to two oxygen atoms (e.g., O=C—O), respectively. Finally, the peak at ~291 eV is generally of the shake-up of the sp2-hybridized carbon atoms.

Figure 3:
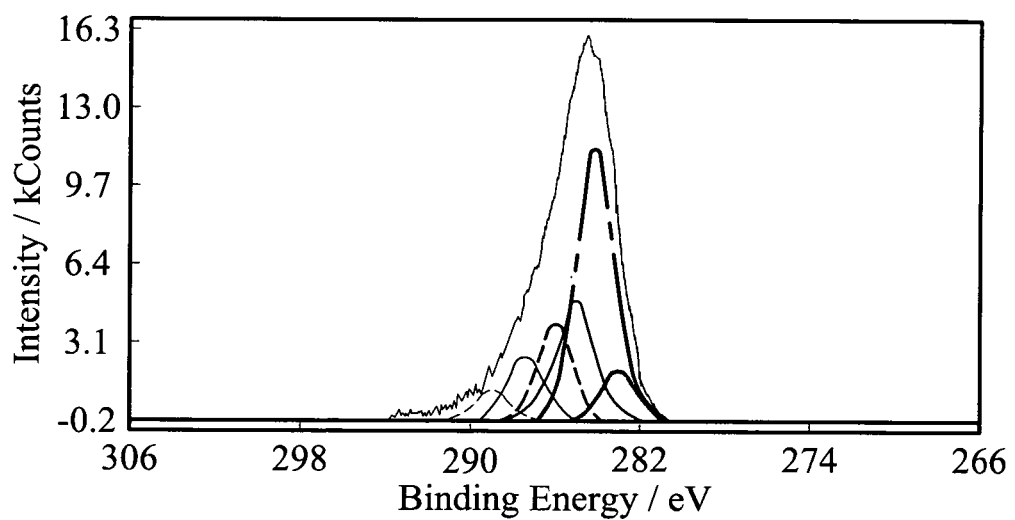
FIG. 3 is an X-ray photoelectron spectrum of the sheet of carbon nanotubes with approximately 2 nanometers of copper sputtered thereon.

The plasma vapor deposition of copper onto the multi-wall CNT sheet may generate a layer of copper on the CNT sheet as thin as approximately or about 0.001 microns (i.e., 1 nanometer) or even less. In the illustrated example, copper was sputtered (using plasma vapor deposition) onto the multi-wall CNT sheet to a depth/thickness of approximately 2 nanometers. Following the copper deposition, another X-ray photoelectron spectrum was generated. The X-ray photoelectron spectrum of the C 1s region of the copper coated multi-wall CNT sheet is shown in FIG. 3. Upon deconvolution of the C 1s spectrum, seven peaks were revealed. The formation of a new peak associated with the formation of copper carbide, that is, a copper-carbon bond, at the surface region of the CNT sheet was observed. More specifically, the first observed and noticeable peak at 283 eV is due to the formation of copper metal carbide. The observance of the metal carbide peak is indicative of chemical bonding between the copper and available carbon atoms "C". Similar to the spectrum shown in FIG. 2, the second peak at 284 eV is due to sp2-hybridized carbon atoms and carbon atoms bonded to hydrogen atoms. The peak at 285 eV is attributed to the sp3-hybridized carbon atoms. The peaks centered at ~286 eV, 287 eV, and 289 eV correspond to the carbon atoms bonded to one oxygen atom by a single bond (e.g., C—O), by a double bond (e.g., C=O), and to two oxygen atoms (e.g., O=C—O), respectively. Finally, the peak at ~291 eV is common of the shake-up of the sp2-hybridized carbon atoms.

Figure 4:
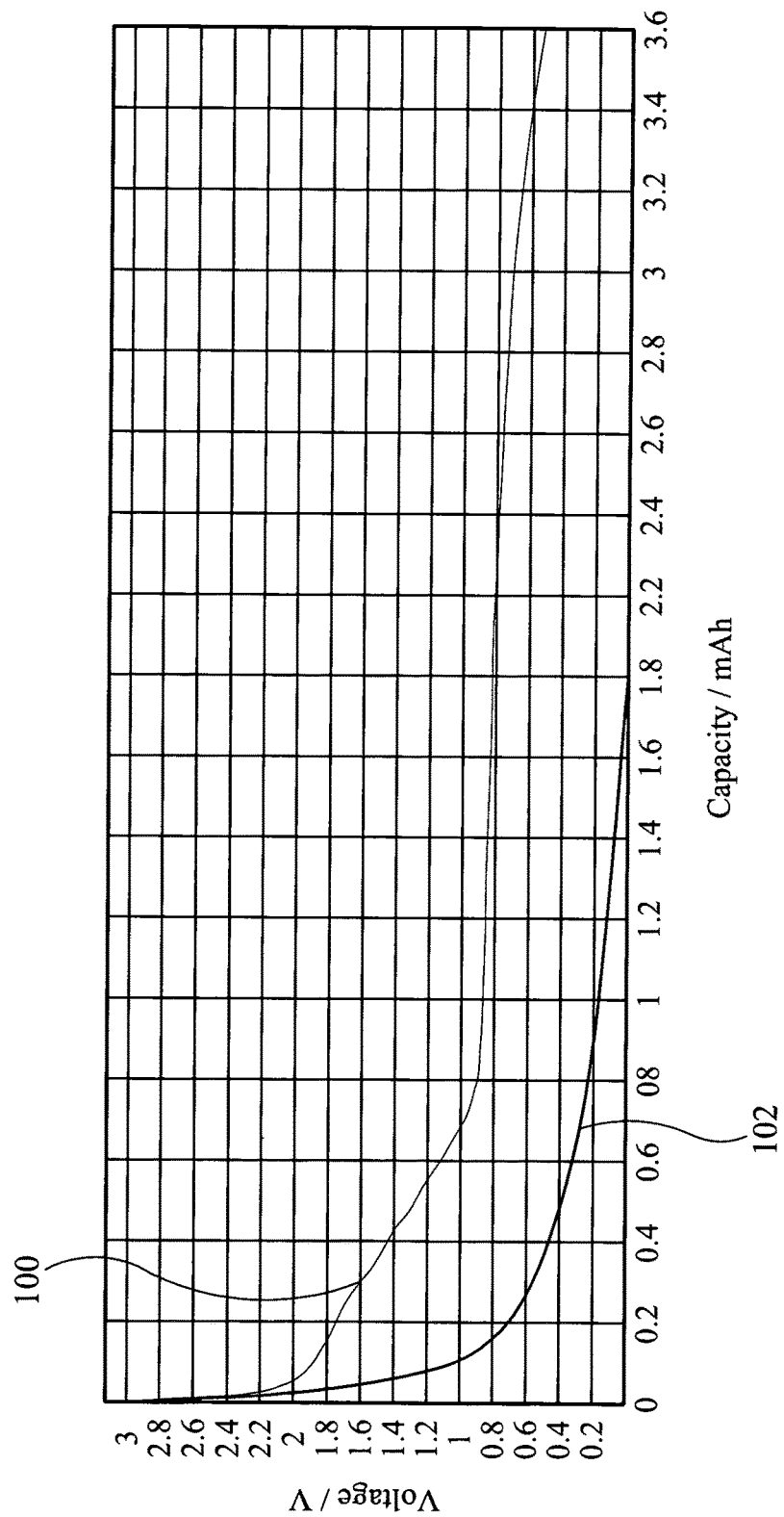
FIG. 4 is a graph of the discharge capacity of a sheet of carbon nanotubes with approximately 2 nanometers of copper sputtered thereon.

The above-described example was tested for specific discharge capacity with the results being illustrated in FIG. 4. Briefly, a three electrode cell was assembled in an argon-filled glovebox using lithium foil as the reference and counter electrodes, and a Celgard® separator. The working electrode was the above-described copper-sputtered CNT sheet with an approximate area of 1.7 cm$^2$, and an active mass of approximately 3.3 mg. The electrolyte solution was 1 M LiPF$_6$ dissolved in ethylene carbonate and dimethyl carbonate in a 1:1 by volume ratio. The electrochemical characteristics were studied using a Maccor® 4304 battery test system. The charge-discharge measurements were performed at a constant current of 150 micro amp and a voltage range of 0.02-3.2 volts.

Two discharge capacities are plotted in FIG. 4 where curve 100 illustrates the results of the initial discharge and curve 102 illustrates the results of the second discharge. The specific capacity of the initial discharge was 1090 mAh/g, and the specific capacity of the second discharge was 575 mAh/g. As is known in the art, an electrode's initial specific capacity is always greater than its second and subsequent specific capacities. Further, it is also known that an electrode's second specific capacity is a good indicator of what the specific capacity will be over the life of an electrode. Accordingly, the discharge capacity of 575 mAh/g in the illustrated "copper-sputtered CNT sheet" example indicates an increase of more than 50%, over graphite-based electrodes.

The advantages of the present invention are numerous. The chemical bonding between available carbon atoms and copper atoms eliminates discontinuities at the CNT-copper interface and eliminates the need for a separate current collector. Further, the amount of copper needed is greatly reduced since thicknesses of less than 10 microns may be used to cover a surface region and provide for chemical bonding to the available carbon atoms. In general, thicknesses of metal 14 may range between approximately or about 0.001 microns (or less) to approximately or about 100 microns. Therefore, metal 14 may be more than 1000 times thinner than conventional copper foil current collectors. Thus, the composite electrode of the present invention will be lighter in weight than copper-foil-based electrodes. Still further, the present invention provides a composite electrode having a substantially increased specific capacity as compared to graphite-based electrodes. In addition, since CNTs present a much larger surface area as compared to graphite, CNTs have more sites for chemical interaction/bonding with the conductive metal such as copper. The chemical bond between available carbon atoms on the CNTs and the copper provides for direct electrical connectivity to the CNTs.

Although the invention has been described relative to a specific exemplary embodiment thereof, there are numerous variations and modifications that will be readily apparent to those skilled in the art in light of the above teachings. For example, the amount/thickness of metal (e.g., copper) used to form the electrode may be increased beyond the amounts described above without departing from the scope of the present invention. Accordingly, FIG. 4 illustrates another composite electrode 20 having an electrically conductive metal 24 (e.g., copper) disposed on a sheet of CNTs 22. As in the previously-described embodiment, surface region 22A includes exposed portions of CNTs where there are available carbon atoms "C" that are chemically bonded to copper atoms "Cu" at surface region 22A. Metal 24 includes an additional deposition region 24A built up to a desired thickness but not chemically bonded to surface region 22A.

Figure 5:
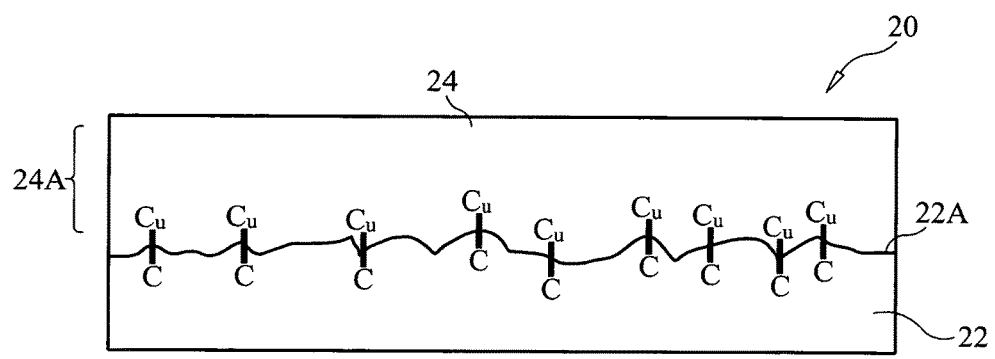
FIG. 5 is a schematic view of a composite electrode in accordance with another embodiment of the present invention.
Figure 6:
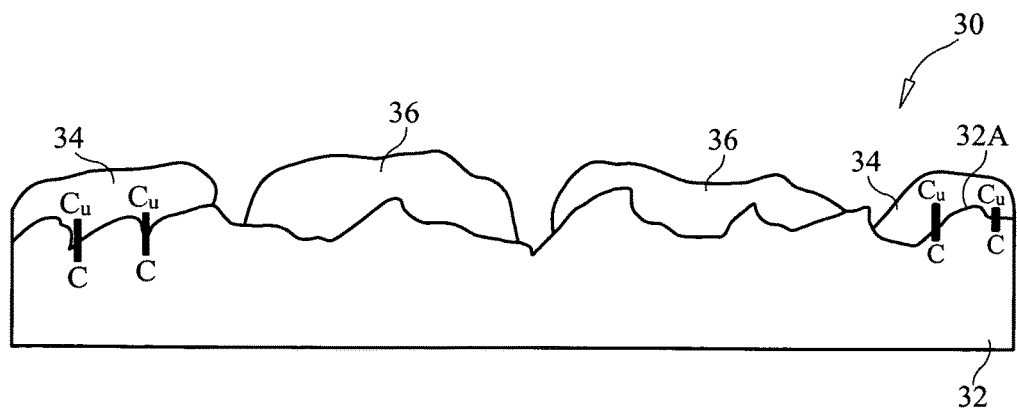
FIG. 6 is a schematic view of a composite electrode in accordance with yet another embodiment of the present invention.

Another exemplary embodiment of the present invention is illustrated in FIG. 5 where a composite electrode 30 includes a sheet of CNTs 32 defining a geometrically irregular surface region 32A, an electrically conductive metal 34 covering and chemically bonded to available carbon atom "C" at one or portions of surface region 32A, and another material 36 (e.g., silicon, germanium, or both) disposed on one or more other portions of surface region 32A. Material 36 may be selected to satisfy other application requirements. For example, material 36 may be a metal (e.g., a non-copper metal) that is different than that used for metal 34, or a material such as silicon or germanium that are known to improve a battery's capacity. Importantly, the material may include at least one of silicon and germanium, and so also may include both silicon and germanium. The system also may include a metal, silicon and germanium depending on the needs, performance and output sought from the system. Metal 34 and material 36 may be applied to surface region 32A in the same fashion (e.g., vapor deposition). Metal 34 and material 36 may be applied to surface region 32A in specific patterns to satisfy application requirements. It is therefore to be understood that, within the scope of the appended claims, the invention may be practiced other than as specifically described.

Finally, any numerical parameters set forth in the specification and attached claims are approximations (for example, by using the terms "approximately" or "about") that may vary depending upon the desired properties sought to be obtained by the present invention. At the very least, and not as an attempt to limit the application of the doctrine of equivalents to the scope of the claims, each numerical parameter should be at least construed in light of the number of significant digits and by applying ordinary rounding.

What is claimed as new and desired to be secured by Letters Patent of the United States is:

1. A composite electrode, comprising:
   a sheet of carbon nanotubes,
      wherein said sheet includes a surface region, and
      wherein carbon atoms are available at said surface region; and
   an electrically conductive metal contacting at least a portion of said carbon atoms at said surface region on one side of the sheet of carbon nanotubes thus defining an interface being produced by sputter deposition,
      wherein said interface is a carbon nanotube-copper (CNT-CU) interface that exists as a metal carbide, which comprises a chemical bond, and
      wherein said interface is continuous and absent discontinuities.

2. The composite electrode as in claim 1, wherein said electrically conductive metal covers said surface region.

3. The composite electrode as in claim 1, further comprising a thickness of said electrically conductive metal is less than approximately 100 microns.

4. The composite electrode as in claim 1, further comprising a thickness of said electrically conductive metal is between approximately 0.001 microns and approximately 100 microns.

5. The composite electrode as in claim 1, wherein said electrically conductive metal comprises copper, and wherein said metal carbide comprises copper metal carbide.

6. The composite electrode as in claim 1, further comprising a material selected from the group consisting of silicon and germanium, said material covering a portion of said surface region.

7. A composite electrode, comprising:
   a sheet of carbon nanotubes, wherein said sheet includes a surface region to include exposed portions of said carbon nanotubes and carbonous filler material, and wherein carbon atoms are available at said exposed portions of said carbon nanotubes and said carbonous filler material; and
   a layer of an electrically conductive metal being disposed on said surface region, wherein a portion of said layer contacts at least a portion of said carbon atoms at said surface region on one side of the sheet of carbon nanotubes thus defining an interface produced by a sputter deposition process,
      wherein said interface is a carbon nanotube-copper (CNT-CU) interface that exists as a metal carbide, which comprises a chemical bond, and
      wherein said interface is continuous and absent discontinuities.

8. The composite electrode as in claim 7, wherein said layer of said electrically conductive metal covers said surface region.

9. The composite electrode as in claim 7, wherein thickness of said layer of said electrically conductive metal is less than approximately 100 microns.

10. The composite electrode as in claim 7, wherein thickness of said layer of said electrically conductive metal is between approximately 0.001 microns and approximately 100 microns.

11. The composite electrode as in claim 7, wherein said electrically conductive metal comprises copper, and wherein said metal carbide comprises copper metal carbide.

12. The composite electrode as in claim 7, wherein said layer of said electrically conductive metal is disposed on a first portion of said surface region, said composite electrode further comprising a material disposed on a second portion of said surface region, said material being selected from the group consisting of silicon and germanium.

13. A composite electrode, comprising:
   a sheet of carbon nanotubes, wherein said sheet includes a geometrically irregular surface region, and wherein carbon atoms are available at said geometrically irregular surface region; and
   a layer of copper covering at least a portion of said surface region, wherein a portion of said layer of copper contacts at least a portion of said carbon atoms at said surface region on one side of the sheet of carbon nanotubes thus defining an interface by a sputter deposition process,
      wherein said interface is a carbon nanotube-copper (CNT-CU) interface that exists as a metal carbide, which comprises a chemical bond, and
      wherein said interface is continuous and absent discontinuities.

14. The composite electrode as in claim 13, wherein said layer of copper covers said surface region.

15. The composite electrode as in claim 13, wherein thickness of said layer of copper is less than approximately 100 microns.

16. The composite electrode as in claim 13, wherein thickness of said layer of copper is between approximately 0.001 microns and approximately 100 microns.

17. The composite electrode as in claim 13, wherein said layer of copper is disposed on a first portion of said surface region, wherein said composite electrode further comprises a second material disposed on a second portion of said surface region, said second material is selected from the group consisting of at least one of a non-copper metal, silicon, and germanium.

* * * * *